United States Patent [19]
Stuart

[11] Patent Number: 5,392,815
[45] Date of Patent: Feb. 28, 1995

[54] GRADATIONAL TUBE BUNDLE FLOW CONDITIONER FOR PROVIDING A NATURAL FLOW PROFILE TO FACILITATE ACCURATE ORIFICE METERING IN FLUID FILLED CONDUITS

[75] Inventor: John W. Stuart, Lafayette, Calif.

[73] Assignee: Pacific Gas and Electric Company, San Francisco, Calif.

[21] Appl. No.: 102,410

[22] Filed: Aug. 5, 1993

[51] Int. Cl.⁶ ............................................. F15D 1/00
[52] U.S. Cl. ................................... 138/37; 138/39; 138/44; 138/40; 206/443
[58] Field of Search ............... 138/37, 39, 40, 44; 206/443, 446, 500, 526, 585

[56] References Cited

U.S. PATENT DOCUMENTS

| | | | |
|---|---|---|---|
| 1,448,151 | 3/1923 | Reeves | 138/40 |
| 2,688,985 | 9/1954 | Holdenried | 138/37 |
| 2,825,203 | 3/1958 | Bertin et al. | 138/44 |
| 3,250,469 | 5/1966 | Colston | 73/861.52 |
| 3,733,898 | 5/1973 | Yamamoto et al. | 138/39 |
| 3,838,598 | 10/1974 | Tompkins | 138/37 |
| 3,840,051 | 10/1974 | Akashi | 138/37 |
| 4,280,360 | 7/1981 | Kabayashi et al. | 138/37 |
| 4,643,307 | 2/1987 | Wilkinson | 206/443 |
| 4,688,755 | 8/1987 | Pluviose | 138/44 |
| 5,255,716 | 10/1993 | Wilcox | 138/44 |
| 5,307,830 | 5/1994 | Welker | 138/39 |

FOREIGN PATENT DOCUMENTS

588331 5/1947 United Kingdom ............... 138/37

Primary Examiner—James E. Bryant, III
Attorney, Agent, or Firm—Owen, Wickersham & Erickson

[57] ABSTRACT

A flow conditioner for providing a relatively ideal flow profile when used in a fluid conduit upstream from an orifice meter comprises a bundle of parallel tubes including a central tube having the largest diameter in the range of 0.2 to 0.5 times the conduit internal diameter. The central tube is surrounded by circular arrays of tubes each having a diameter smaller than the central tube so that the flow conditioner produces an orifice discharge coefficient that does not vary from a coefficient created by non swirling, fully developed ideal flow conditions.

7 Claims, 6 Drawing Sheets

FIG._4A  X/D, DISTANCE FROM TUBE BUNDLE TO ORIFICE PLATE

FIG._5A  X/D, DISTANCE FROM TUBE BUNDLE TO ORIFICE PLATE

GRADATIONAL TUBE BUNDLE FLOW CONDITIONER FOR PROVIDING A NATURAL FLOW PROFILE TO FACILITATE ACCURATE ORIFICE METERING IN FLUID FILLED CONDUITS

SPECIFICATION

This invention relates to conditioning of fluid flow through a cylindrical pipe to achieve a non swirling symmetrical fully developed turbulent flow profile within a short distance in order to insure accurate flow rate measurement of that fluid by a downstream orifice meter.

BACKGROUND OF THE INVENTION

Many industries, including the oil and gas industry make extensive use of orifice meters to measure the flow of fluids from wells, through processing plants, along pipelines, and delivery to customers. An estimated 700,000 orifice meters are in use in the United States alone. The orifice meter has attained such popularity because it is simple, reliable, inexpensive, and does not require individual calibration. Based on a principle of similitude, if orifice meters are manufactured within specified physical dimensions their calibration constant or discharge coefficient "Cd" can be calculated using an industry standard equation, such as the one in ANSI/API 2530 (American National Standards Institute/American Petroleum Institute). This equation was developed from thousands of careful laboratory tests using various meter sizes, orifice bore sizes, fluids, and flow rates. To provide for consistent accuracy of orifice meter measurements long lengths of straight pipe were used upstream of the laboratory orifice meters to insure that the flow entering the orifice meter had an "ideal" fully development velocity profile and was free of any swirl. This requirement is particularly essential for installation of orifice meters in the field where the accuracy of measuring fluid flow for custody transfer, such as natural gas in a pipe line, is a critical necessity.

Most of the orifice meters in North America have been installed with much shorter lengths of upstream pipe as allowed by industry standards (ANSI/API 2530). Therefore, to eliminate swirl of the fluid and to provide a velocity profile that assures a high degree of accuracy, most orifice meter installations also incorporate a flow conditioner at a distance of 7 conduit diameters upstream of the orifice meter. Heretofore, these flow conditioners, as recommended by industry standards, consisted of a bundle of 19 tubes of equal diameter.

During the past five years or so, it has come to the attention of the gas measurement industry that the commonly used 19 tube bundle flow conditioner design, when used with orifice meters, can cause a significant measurement error. With high beta ratio orifice plates, that is, where the orifice diameter is relatively large compared with the pipe diameter, this error can be up to 1.5%.

The GRI (Gas Research Institute) has contracted several research laboratories to analyze this problem and find an acceptable installation location for the traditional 19 tube bundle flow conditioner. Tests at various research facilities have shown that the 19 tube bundle flow conditioner cannot be used in most existing meter tubes without expecting some measurement error, either positive or negative.

The 19 tube bundle flow conditioner in common use today is fabricated with 19 tubes of equal diameter. Tests have shown that this design produces a profile that is too flat and does not develop into a stable ideal profile until the fluid has traveled for over 30 meter tube diameters downstream. Thus, in actual fluid conduit installations, meter tubes would have to be over 30 diameters long when using the traditional 19 tube bundle flow conditioner.

Most of the meter tubes installed in North America are only 17 diameters long, and a 19 tube bundle flow conditioner is normally placed 7 diameters upstream of the orifice plate. This arrangement caused flow measurement errors, and thus the gas measurement industry faced the problem of finding an acceptable flow conditioner that could be located in the hundreds of thousands of existing, 17 diameter long, meter tubes.

In one attempt to overcome the aforesaid deficiencies of the 19 tube flow conditioner, the use of a flow conditioner (British Patent Application No. 8916629, E. M. Laws) consisting of a thick plate with a central hole and two rings of smaller holes has been proposed. However, the plate type flow conditioner inherently produces a high percentage of flow blockage which causes excessive pressure drop of the flowing fluid in a conduit. With a tube bundle the blockage is less and it has substantially less pressure drop which is often an energy saving economic advantage. Also, the tube bundle can be positioned closer to the orifice, thus requiring a shorter meter tube.

Another plate type flow conditioner has been disclosed in U.S. Pat. No. 3,840,051, commonly referred to as the Mitsubishi Flow Conditioner which consists of a plate perforated with a pattern of equal size holes.

In U.S. Pat. No. 3,733,898, another Flow Conditioning Apparatus is described which includes a bundle of 7 tubes of equal diameter and length.

However, prior to the present invention the prior art failed to solve the problem of providing a fluid flow conditioner capable of a removing swirl and flow profile asymmetries upstream from an orifice meter so as to provide consistently accurate flow rate measurements. This problem is solved by the present invention which also provides a flow-conditioner that is relatively inexpensive to produce and easy to install in existing meter tubes.

SUMMARY OF THE INVENTION

In accordance with the principles of the present invention a flow conditioner is provided which is comprised of a bundle of parallel closely bunched tubes that are held together as a substantially cylindrical unit that can be installed within the meter tube of a fluid carrying conduit at a relatively short distance (e.g. 7 pipe diameters) from a standard orifice plate. The flow conditioner produces a near ideal "fully developed" flow profile that is shaped like a blunt bullet with a center velocity about 15% higher than the average bulk velocity.

The aforesaid preferred profile is achieved with a tube bundle comprised of a central tube having a relatively large diameter which is approximately 0.25 D where D is the meter tube inside diameter. Surrounding the central tube is a first circular array of 7 intermediate tubes having a diameter that is somewhat less than that of the central tube. Surrounding the first circular array is an outer array of 14 tubes, 7 of which are of the intermediate diameter and 7 of which are of a smaller diameter. This tube bundle arrangement provides an orifice coefficient that is near "ideal" with minimum shift and therefore enables the orifice plate to make highly accurate flow measurements.

Other objects, advantages and features of the invention will become apparent from the following detailed description, presented in conjunction with the accompanying drawing.

DETAILED DESCRIPTION OF EMBODIMENT

Figure 1:
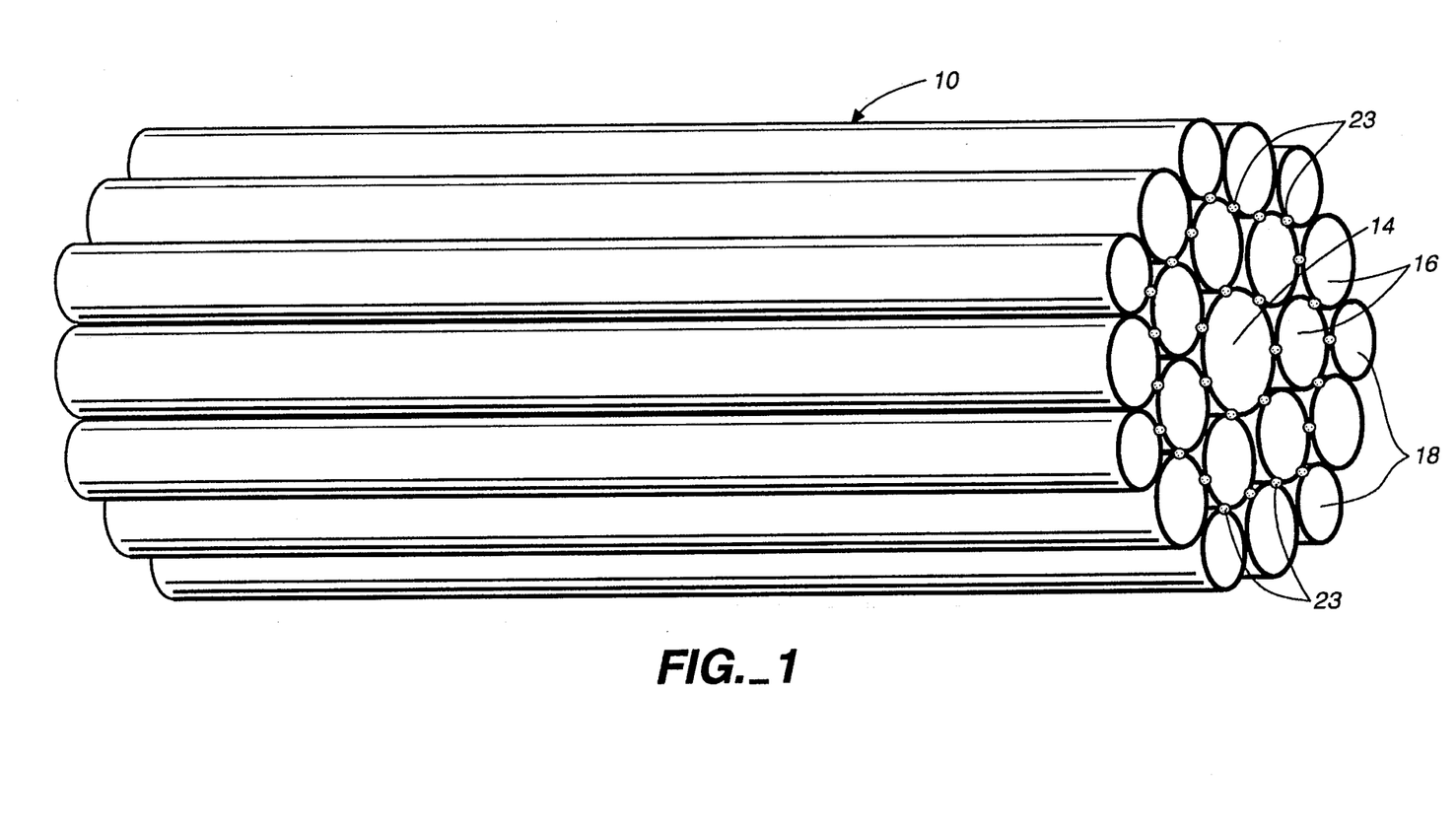
FIG. 1 is a view in perspective of a flow conditioner embodying principles of the present invention.
Figure 2:
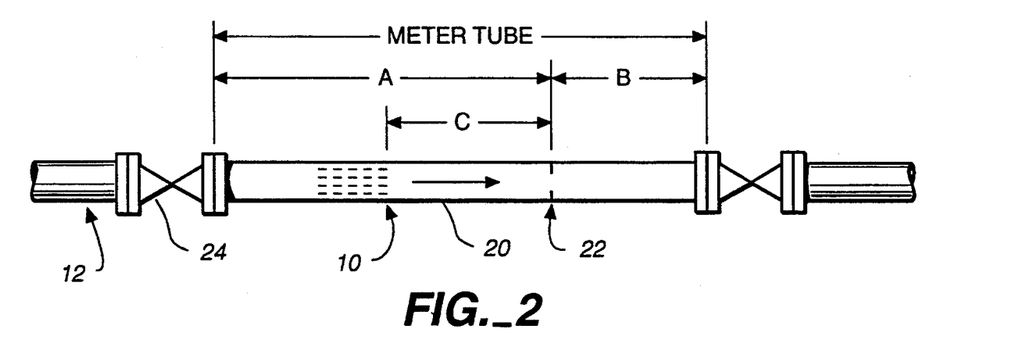
FIG. 2 is a diagrammatic view of a typical installation of a flow conditioner in a meter tube fluid conduit.

With reference to the drawing, FIG. 1 shows a flow conditioner 10, embodying principles of the present invention as it would be used in a typical installation within a meter tube 20 of a conduit 12 for carrying a fluid such as natural gas, as shown in FIG. 2. In general, the flow conditioner 10 comprises a bundle of cylindrical, thin-walled tubes which are held together by suitable means such as spot welds.

In the embodiment shown in FIG. 1, the flow conditioner 10 is comprised of 22 tubes including a central tube 14 which has a relatively large diameter that is approximately 0.25 times the inside diameter (D) of a meter tube 20 in which the flow conditioner is to be installed. Surrounding the central tube 14 are 7 tubes 16 of a lesser diameter (e.g. 0.188 D) which are arranged in a circular array in close contact with themselves and the central tube. Surrounding the array of tubes 16 is an outer array of 14 tubes comprised of 7 tubes 16 and 7 tubes 18 of a lesser diameter than the tubes 16 (e.g. 0.146 D to 0.187 D). The diameter of tubes 18 may vary to fit different meter tube internal diameters. The tubes are held together by spot welds indicated by the numeral 23 in FIG. 1. When viewed in cross-section it is seen that the bundle of 22 tubes of three different diameters covers substantially the entire cross-sectional area of the meter tube 20 which retains the flow conditioner 10.

The main consideration for use of a flow conditioner upstream of an orifice meter is to minimize flow disturbances which may be caused by bends, valves or any upstream pipe fittings, thereby maximizing accuracy of the flow measurements at the orifice plate. Use of the flow conditioner 10 serves to reduce the amount of straight pipe or meter tube required upstream of the orifice plate by eliminating the effect of swirls and cross currents caused by such pipe fittings and valves upstream of the meter tube.

In the typical arrangement of the gas supply conduit 12 shown in FIG. 2, the flow conditioner 10 is installed in a meter tube section 20 of the conduit 12 at a distance "C" from an orifice plate 22 in the meter tube. The orifice plate is located at a distance A downstream from a turbulence causing regulator, partially closed valve 24, or elbows, and an upstream distance B from the end of the meter tube. Based on standards set by the American Gas Association, and the American Petroleum Institute (ANSI/API 2530), the values of dimensions A, B and C for different typical flow, conditioner installations are readily available for use in designing measuring orifice and flow conditioner installations. Tests have proven that the flow conditioner 10 provides an accuracy performance level that enables it to be installed well within the aforesaid location dimension criteria.

In prior attempts to develop accurate fluid flow measuring systems, very long lengths of straight pipe were used upstream of the laboratory orifice meters to insure that the flow entering the orifice meter had an "ideal" fully development velocity profile and was free of any swirl.

Thus, the orifice meter equation published as ANSI/API 2530 (A.G.A. Report No. 3) and a similar equation published as ISO 5167, were based on test data measured with over 40 diameters of straight pipe upstream of the orifice plate.

Because of the high cost and space requirements of installing a 40+ diameter long meter tubes in the field, ANSI/API 2530 has allowed meter tubes to be shorter, especially if a "straightening vane" flow conditioner is used to remove any swirl. A very common installation specified in ANSI/API 2530 is to have 17 diameters of straight meter tube upstream of the orifice meter, containing a tube bundle flow conditioner located at 7 diameters upstream of the orifice meter.

The assumption has been that the flow conditioner would remove any swirl, and that the 7 diameter distance was sufficient to create a profile so close to the ideal that the difference could not be measured. This assumption was valid for several decades until the mid 1980's when laboratories with better instrumentation were able to measure an error created by a traditional flow conditioner 13, shown in FIG. 3.

Figure 3:
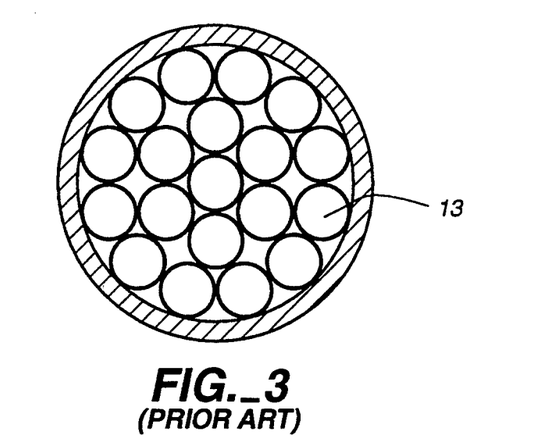
FIG. 3 is a cross-sectional view of a traditional prior art flow conditioner.

This prior art flow conditioner 13 comprised a bundle of 19 tubes of equal length wherein all of the tubes were of the same diameter. Laboratory tests demonstrated and confirmed that the traditional 19 tube bundle flow conditioner created a significant measurement error when installed at the 7 D (diameter) location specified in ANSI/API 2530 or at the 22 D location specified in ISO 5167. The magnitude of the error increases with the Beta ratio of the orifice meter, i.e. the larger the orifice plate bore diameter, the larger the error. Errors as high as 1.2% were measured when using a 0.73 Beta ratio orifice plate.

Figure 3A:
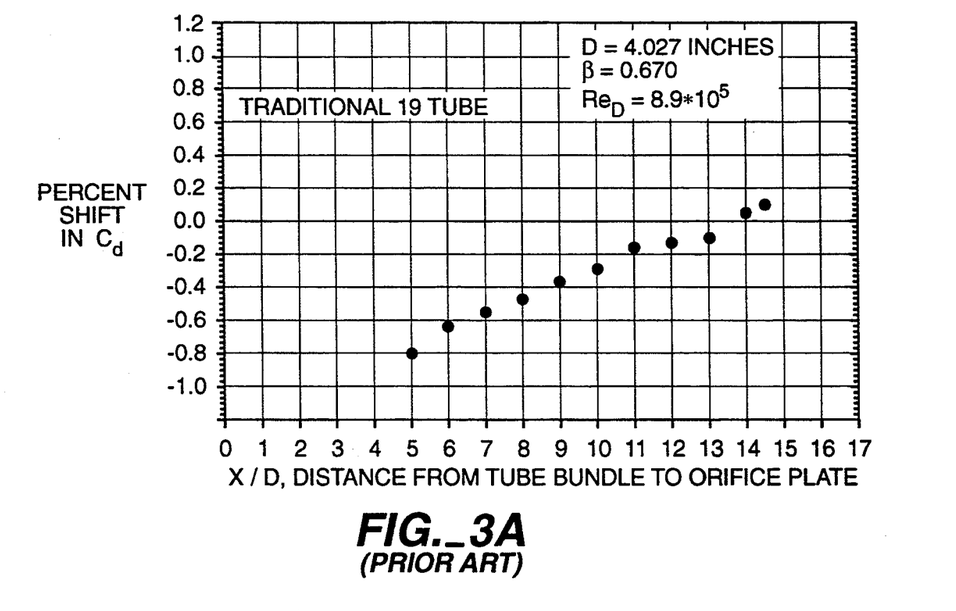
FIG. 3A is a chart showing orifice meter discharge coefficient data using the flow conditioner of FIG. 3.

As shown in FIG. 3A, when a traditional 19 tube bundle flow conditioner 13 was installed at 7 D, the discharge coefficient shifted down from the ideal value. If either ANSI/API 2530 or ISO 5167 was used to compute a discharge coefficient and flow rate, the results became too high. Thus a tube bundle at 7 D caused an over-measurement of volume. If the same flow conditioner was located a 22 D as specified in ISO 5167, the discharge coefficient shifted up, causing an under-measurement of volume. The measurement error at 7 D and at 22 were of about the same magnitude, but in different directions. In both cases the error was highest for the largest Beta ratios.

In the process of overcoming the deficiencies of the traditional 19 tube flow conditioner 13 and developing the more efficient flow conditioner 10 according to the present invention, several configurations of tube bundles were assembled and tested.

FIGS. 3A through 9A plot the performance of different tube bundle configurations taken during "sliding vane" tests. The abscissa, or horizontal axis, is the distance from the tube bundle to the orifice plate. The ordinate, or vertical axis, is the percent shift in Cd, orifice discharge coefficient, compared to a desired Cd measured during previous tests under ideal, fully developed flow profile conditions.

Basically, the tests involved a sliding vane technique which consisted of positioning a tube bundle flow conditioner test unit within a meter tube at a particular distance upstream of an orifice plate. Fluid at a known flow rate was passed through the flow conditioner and the orifice meter, measuring the differential pressure across the orifice plate, and computing the effective orifice discharge coefficient Cd. This effective Cd was then compared with the Cd previously measured under "ideal" flow conditions and the difference or variance of Cd at each location is plotted as a percent shift in Cd (shown as black dots on the illustrated charts). The goal of an effective flow conditioner design is to have less than 0.1% shift in Cd when installed near the x/D=7 location relative to the orifice plate.

In FIG. 3A, the sliding vane test results for the traditional 19 tube bundle configuration indicates Cd shift of −0.8 to +0.1% over a range of x/D from 5 to 14.5, a variance that is now considered unacceptable.

Figure 4:
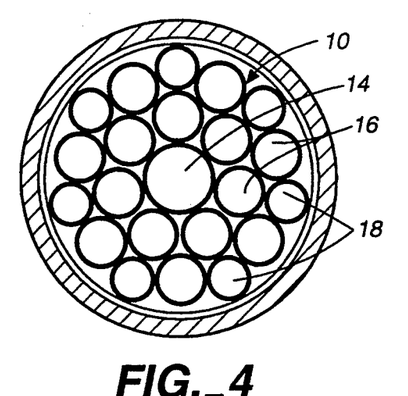
FIG. 4 is a cross-sectional view of the flow conditioner according to the present invention.
Figure 4A:
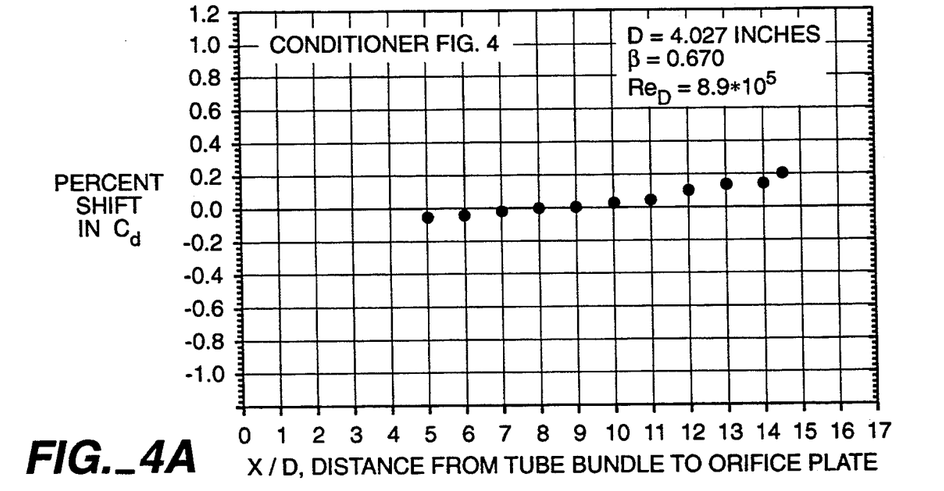
FIG. 4A is a chart showing orifice meter discharge coefficient data using the flow conditioner of FIG. 4.

Contrary to the results shown in FIG. 3A, the flow conditioner 10, embodying the present invention as shown in FIG. 4, provides test results as indicated in FIG. 4A where the shift in Cd is negligible and at x/D=7, the Cd shift is essentially zero. Thus, using the conditioner 10 at a distance of 7 diameters (7 times the meter tube inside diameter) from the orifice plate, will enable a standard orifice plate to measure flow with essentially zero error.

Figure 3B:
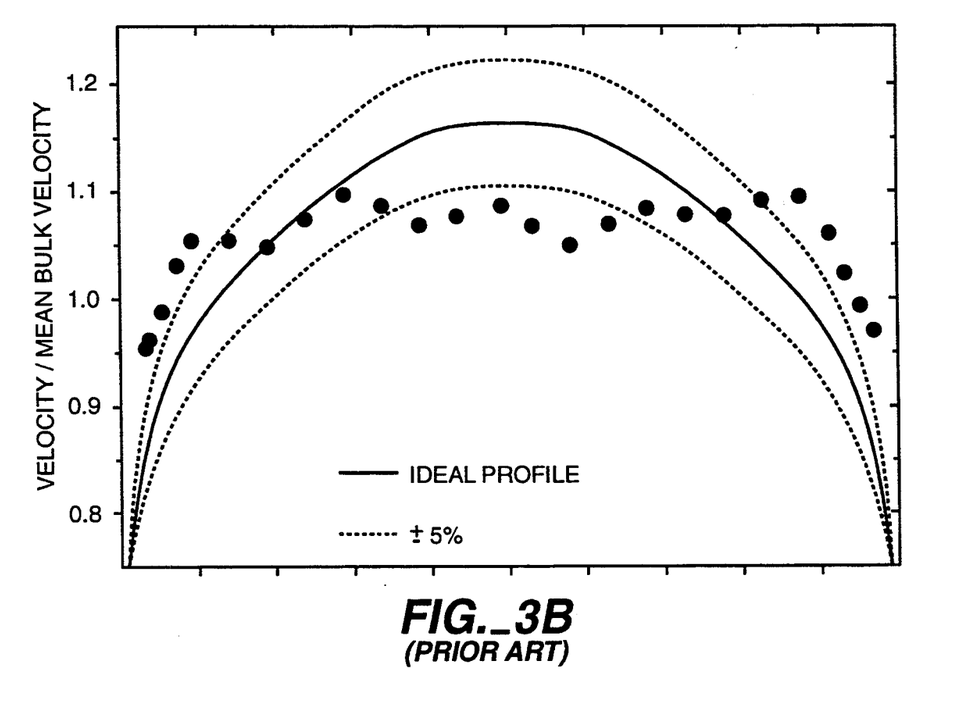
FIG. 3B is a plot of a velocity profile for the flow conditioner of FIG. 3.
Figure 4B:
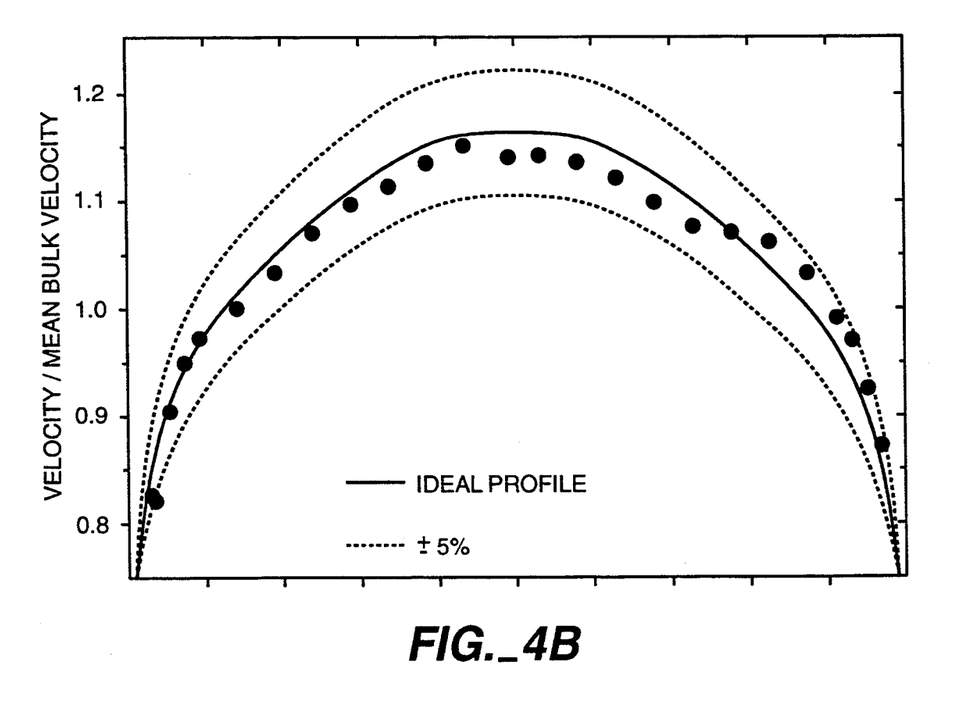
FIG. 4B is a plot of a velocity profile for the flow conditioner of FIG. 4.

Also, with reference to FIGS. 3B and 4B, a comparison of velocity profiles shows graphically the profile improvement provided by the flow conditioner 10 of FIG. 4. FIG. 3B illustrates the irregularity and flatness of the profile produced 5 D to 10 D downstream of a traditional 19 tube conditioner 13 which will cause the orifice plate to have a Cd that is 0.8% to 0.25% low.

Now, turning to FIG. 4B, it is shown that the velocity profile produced by the conditioner 10 is near to the ideal shape thus providing an accurate Cd anywhere within the critical x/D=5 to 11 range as shown in FIG. 4A.

Several other tube bundle configurations were tested and exhibited a surprisingly wide variety of performances. All of these tube bundle configurations utilize an enlarged central tube having a diameter of approximately 0.25 times the meter tube internal diameter which has proven to be an important feature of the present invention. In FIGS. 5-9, these other tube bundle configurations are shown together with a performance chart for each configuration in FIGS. 5A-9A. While different performance characteristics are shown in each example, none provide the unusually accurate results produced by conditioner 10, as shown in FIG. 4A.

Figure 5:
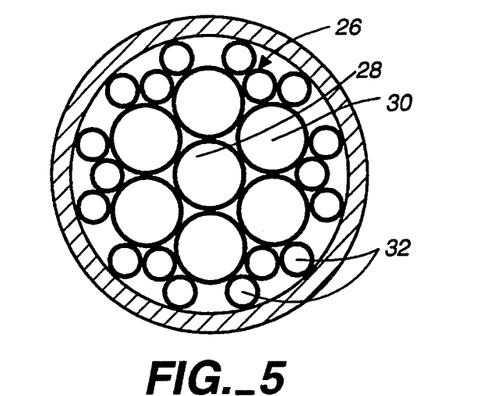
FIG. 5 is a cross-sectional view of another flow conditioner comprised of tubes of different diameters.
Figure 5A:
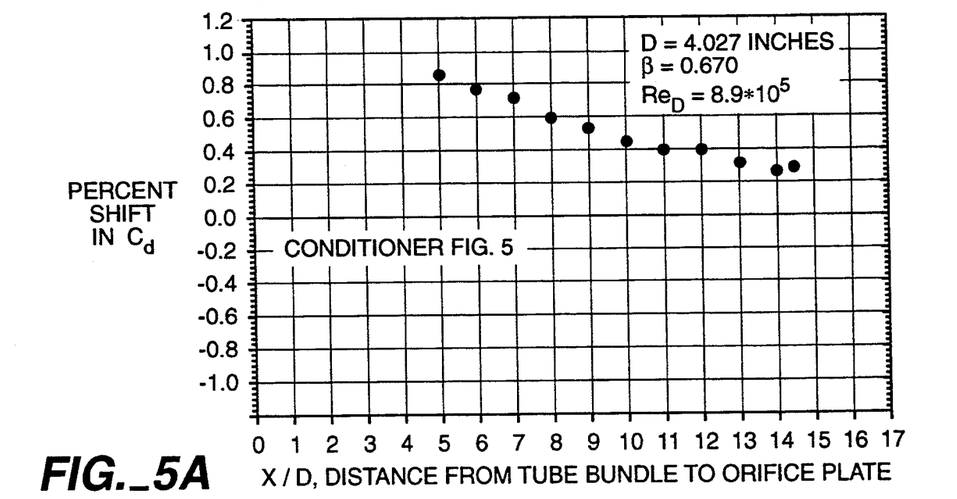
FIG. 5A is a chart showing orifice meter discharge coefficient data using the flow conditioner of FIG. 5.

In FIG. 5, a tube bundle 26 is comprised of a relatively large central tube 28 surrounded by an array 30 of 6 tubes of the same diameter and an outer array 32 of 18 tubes having about one half the diameter of the larger inner tubes. Performance of the conditioner 26 is reduced by allowing too much flow through the large center tubes, and the smaller more restrictive tubes around the outside of the bundle tend to produce a pointed profile and a high Cd.

Figure 6:
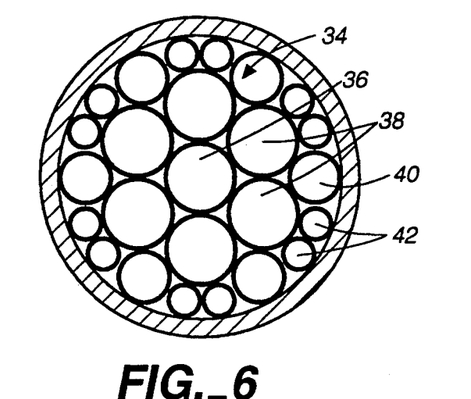
FIG. 6 is a cross-sectional view of another flow conditioner comprised of tubes of different diameters.
Figure 6A:
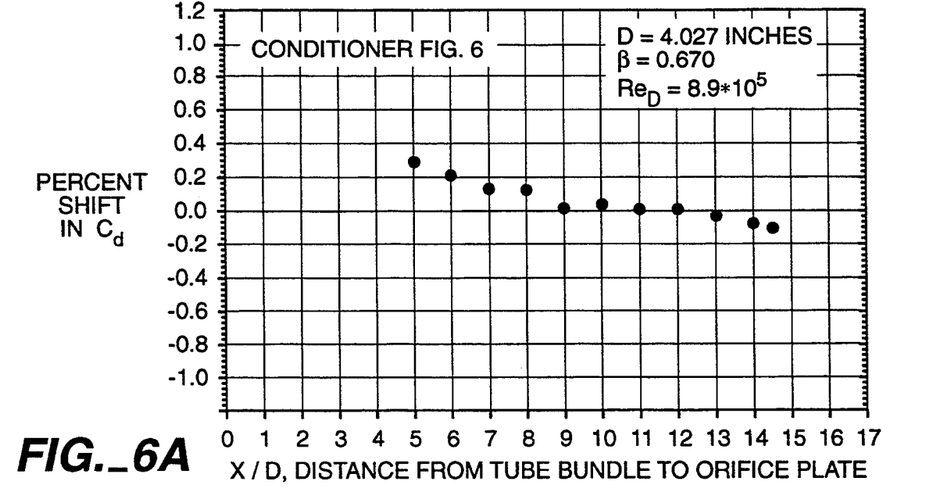
FIG. 6A is a chart showing orifice meter discharge coefficient data using the flow conditioner of FIG. 6.

In FIG. 6, a flow conditioner 34 is shown comprising a 25 tube bundle including a central tube 36 and a surrounding array 38 of 6 tubes having a relatively large diameter, and an outer array of 6 tubes 40 having an intermediate diameter with pairs of relatively small tubes 42 between the intermediate tubes. Performance of the flow conditioner 34, as shown in FIG. 6A was improved over the performance of the conditioner 26 of FIG. 5, with the Cd being closer to the ideal value, but significant shifts of Cd were produced at different x/D distances from the orifice plate.

Figure 7:
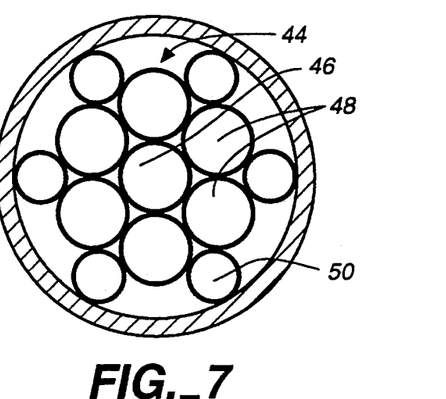
FIG. 7 is a cross-sectional view of another flow conditioner comprised of tubes of different diameters.
Figure 7A:
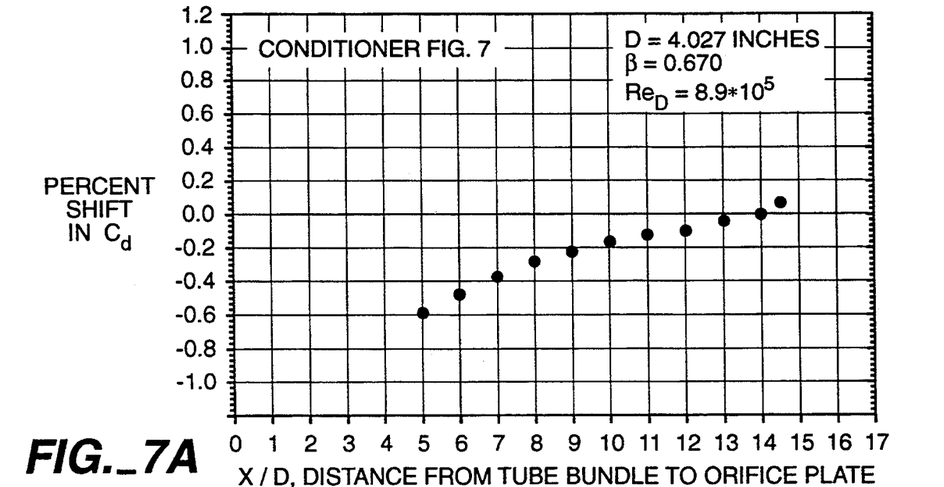
FIG. 7A is a chart showing orifice meter discharge coefficient data using the flow conditioner of FIG. 7.

In FIG. 7, a flow conditioner 44 is shown comprising a 13 tube bundle including a central tube 46 and a surrounding array 48 of 6 tubes having a relatively large diameter, and an outer array 50 of 6 tubes having a smaller diameter. Here again, as shown in FIG. 7A, the performance of conditioner 44 indicates a substantial shift of Cd from its ideal value, particularly at the closer distances from the orifice plate. Here, the profile is probably too flat because there is not enough restriction around the outside of the bundle compared to the seven large tubes at the center of the bundle.

Figure 8:
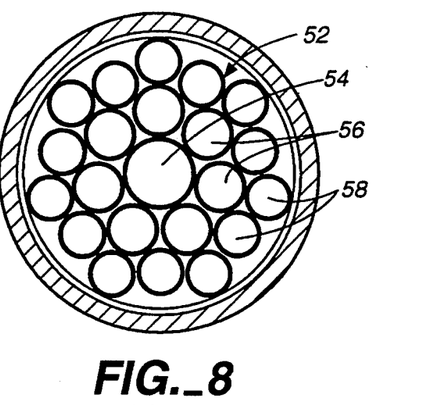
FIG. 8 is a cross-sectional view of another flow conditioner comprised of tubes of different diameters.
Figure 8A:
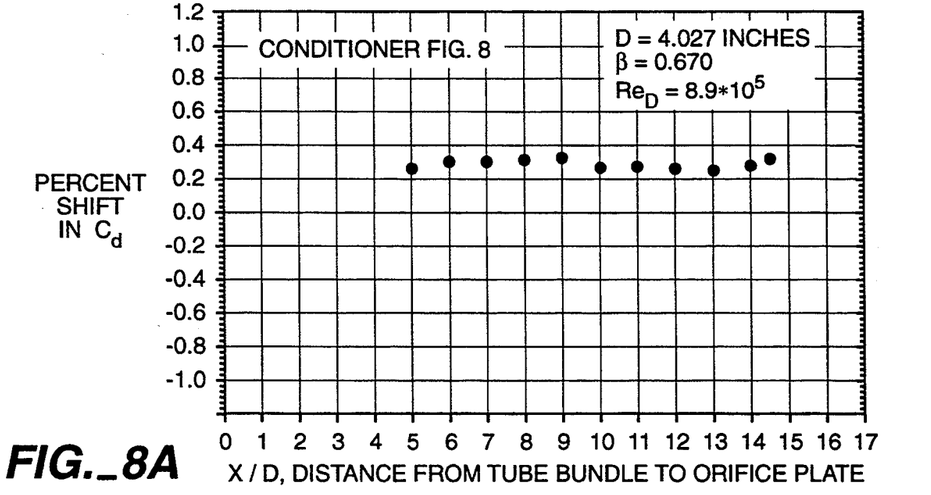
FIG. 8A is a chart showing orifice meter discharge coefficient data using the flow conditioner of FIG. 8.

In FIG. 8, a flow conditioner 52 is shown comprising a central tube 54 of a relatively large diameter surrounded by a first array 56 of 7 tubes of an intermediate diameter and an outer array 58 of 14 tubes of a smaller diameter. Here, the performance of this bundle embodiment shown in FIG. 8A indicates a fairly consistent, but high, shift of Cd from the ideal value.

Figure 9:
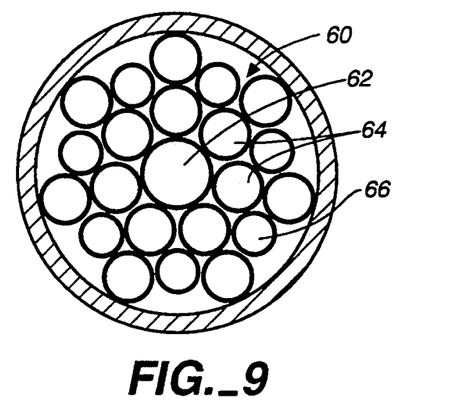
FIG. 9 is a cross-sectional view of another flow conditioner comprised of tubes of different diameters.
Figure 9A:
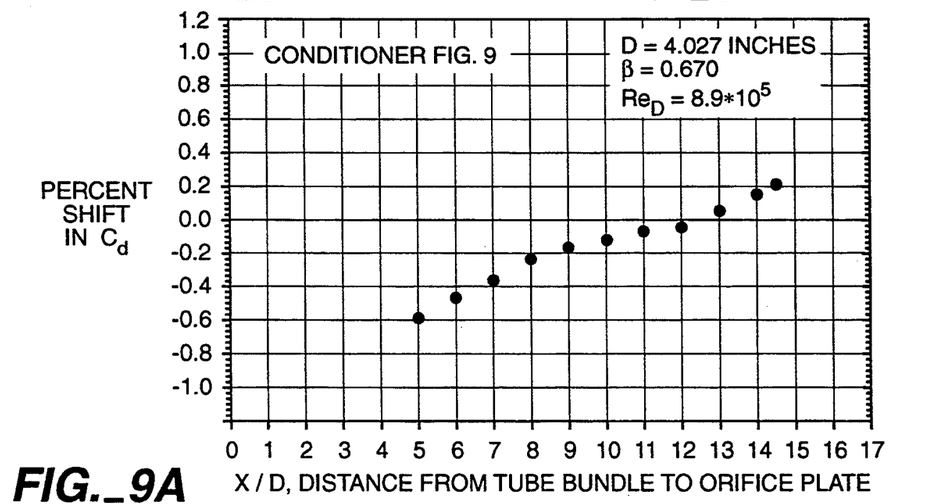
FIG. 9A is a chart showing orifice meter discharge coefficient data using the flow conditioner of FIG. 9.

In FIG. 9, a flow conditioner 60 is shown comprising a central tube 62 of a relatively large diameter surrounded by a first array 64 of 7 tubes having a smaller, intermediate diameter and having an outer array 66 of 14 tubes having alternately intermediate and relatively small diameters. Again, this conditioner allowed too much flow through the outside tube bundle array producing a flat profile and, as shown in FIG. 9A, the shift in Cd from the ideal went from negative to positive for increasing distances from the orifice plate.

In summary, laboratory tests have proven that the flow conditioner 10 provides superior performance over the prior art 19 tube conditioner 13 as well as other tube bundle configurations, and enables the measurement of fluid flow with a high degree of accuracy when used in a meter tube upstream of an orifice plate.

To those skilled in the art to which this invention relates, many changes in construction and widely differing embodiments and applications of the invention will make themselves known without departing from the spirit and scope of the invention. The disclosure and the description herein are purely illustrative and are not intended to be in any sense limiting.

What is claimed is:

1. A flow conditioner for providing a relatively ideal flow profile of a fluid through a cylindrical conduit, comprising:

a bundle of parallel tubes, said bundle including a first central tube forming the center of said bundle having the largest diameter of all said tubes, a first array of intermediate tubes surrounding said central tube each having a diameter smaller than said central tube, and a second array of tubes surrounding said first array consisting of tubes having same diameter as said intermediate tubes, and smaller tubes having a diameter less than said intermediate tubes, and means for holding said tube bundle together so that tubes of said first array are contiguous with said central tube, and tubes of said second array are substantially contiguous with tubes of said first array.

2. The flow conditioner of claim 1 wherein the total number of tubes is 22.

3. The flow conditioner of claim 1 wherein said first array is comprised of 7 tubes of the same diameter.

4. The flow conditioner of claim 1 wherein said second array is comprised of 14 tubes of two different diameters.

5. The flow conditioner of claim 1 wherein said central tube has a diameter that is approximately 0.25 D where "D" is the inside diameter of said conduit.

6. The flow conditioner of claim 5 wherein said intermediate tubes have a diameter that is approximately 0.188 D and said smaller tubes have a diameter that is approximately 0.17 D.

7. A flow conditioner for providing a relatively ideal flow profile of a fluid flowing through a cylindrical conduit, comprising:

a bundle of parallel tubes of varying diameters including:

a central tube having a diameter that is between 0.2 and 0.5 times the conduit internal diameter;

at least two substantially contiguous arrays of outer tubes each having a smaller diameter than said central tube, the tubes making up each substantially contiguous circular array being equal or smaller in diameter than the arrayed tubes or said central tube they surround, said arrays surrounding said central tube in a symmetrical pattern;

whereby said tube bundle, when used as a flow conditioner in a fluid conduit upstream from an orifice meter, produces an orifice discharge coefficient that does not substantially vary from the orifice discharge coefficient created by non swirling, fully developed ideal flow conditions in a straight, relatively long meter tube conduit.

* * * * *